2,987,545
PROCESS OF CONVERTING ESTERS INTO AMIDES

Andrew W. Kende, Hartsdale, and Samuel Kushner, Nanuet, N.Y., assignors to American Cyanamid Company, New York, N.Y., a corporation of Maine
No Drawing. Filed Jan. 30, 1959, Ser. No. 790,062
2 Claims. (Cl. 260—559)

This invention relates to a novel method of converting esters into amides.

In general, organic ester are converted into the corresponding amides by direct treatment with ammonia or an amine. In the case of certain organic esters, however, as, for example, esters which are susceptible to alteration or decomposition under alkaline conditions or in the presence of ammonia or amines, this particular method of amide synthesis cannot readily be used.

We have now discovered an improved method of converting esters into amides which is not subject to the limitations of the previously described methods. In other words, this improved method may be readily applied to organic esters which would decompose under the usual transformation conditions.

In accordance with the present invention an organic ester is converted into its corresponding amide by treatment with ammonium formate or a formate salt of a primary or secondary amine. This reaction is illustrated schematically below:

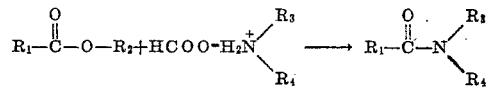

in which $R_1$ is an organic radical, $R_2$ is a lower alkyl radical and $R_3$ and $R_4$ are members of the group consisting of hydrogen atoms and lower alkyl radicals.

The conditions of the reaction are not especially critical. The organic ester is mixed with ammonium formate or a formate salt of a primary or secondary amine and the mixture is heated to a temperature of from about 100° C. to about 160° C. depending upon the nature and physical characteristics of the ester. The period of time required may vary from about 10 minutes to about 15 hours. The final product is isolated from the reaction mixture in a conventional manner and may be purified by recrystallization from alcohol in a standard manner.

In addition to ammonium formate as one of the reactants, formate salts of primary or secondary amines such as methylammonium formate or dimethylammonium formate may be used.

In the examples which follow the invention will be particularly described in connection with the preparation of a new tetracyclic amide, dedimethylamino-6-demethyl-12a-deoxyanhydrochlortetracycline, which has useful antimicrobial activity against various representative test microorganisms. The invention is in no way limited to the preparation of tetracyclic amides, however, as this is for purposes of illustration only, as the invention may be readily carried out in converting other esters represented by the general formula above to the corresponding amide.

The invention will be described in greater detail in conjunction with the following specific examples.

EXAMPLE 1

*Preparation of dedimethylamino-6-demethyl-12a-deoxyanhydrochlortetracycline*

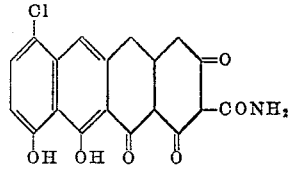

2-chloro-5-methoxy-toluene is converted into the corresponding benzyl bromide by reaction with N-bromosuccinimide. The 2-chloro-5-methoxybenzyl bromide so formed is reacted with diethyl sodiomalonate to form the corresponding benzyl malonic ester which is reduced with lithium aluminum hydride in a conventional manner to form the corresponding 1,3-diol. The resulting 2-(2'-chloro-5'-methoxybenzyl)-1,3-propanediol is reacted with methanesulfonyl chloride to form the corresponding bis-methanesulfonate, which is converted to the corresponding dinitrile by reaction with potassium cyanide. The dinitrile so formed is hydrolyzed to the corresponding β-(2-chloro-5-methoxybenzyl)-glutaric acid by treatment with base. The glutaric acid so formed is then reacted with polyphosphoric acid to form 8-chloro-1,2,3,4-tetrahydro-5-methoxy-4-oxo-2-naphthaleneacetic acid. The naphthaleneacetic acid so formed is converted to the corresponding acyl chloride by treatment with oxalyl chloride and the resulting acyl chloride is converted to the corresponding naphthaleneacetaldehyde by reducing the acyl chloride with hydrogen. The so-prepared 8-choro-1,2,3,4-tetrahydro-5-methoxy-4-oxo-2-naphthaleneacetaldehyde is treated with cyanoacetamide to form 2,2'-dicyano-3-(8-chloro-1,2,3,4-tetrahydro-5-methoxy-4 - oxo - 2 - naphthylmethyl)glutaramide. This product upon acid hydrolysis undergoes demethylation to form 3-(8-chloro-1,2,3,4-tetrahydro-5-hydroxy-4-oxo - 2 - naphthylmethyl)glutaric acid. This product when reacted with benzyl chloride and subsequent esterification produces dimethyl 3-(5-benzyloxy-8-chloro-1,2,3,4-tetrahydro - 4 - oxo - 2 - naphthylmethyl)-glutarate. This product is cyclized by sodium hydride in toluene to form the tricyclic ester methyl 5-benzyloxy-8 - chloro - 1,2,3,4,4a,9,9a10 - octahydro - 4,10 - dioxo-2-anthraceneacetate. Bromination followed by dehydrobromination in collidine converts this product to methyl 5-benzyloxy-10-hydroxy-8-chloro - 1,2,3,4 - tetrahydro-4-oxo-2-anthraceneacetate which is further transformed by the action of dimethyl sulfate and potassium carbonate into the methyl ether methyl 5-benzyloxy-10-methoxy-8-chloro-1,2,3,4-tetrahydro-4-oxo-2 - anthraceneacetate and thence to the tricyclic acid 5-benzyloxy-10-methoxy-8-chloro-1,2,3,4-tetrahydro-4-oxo-2-anthracene acetic acid. This product is then converted to the acylmalonate which is cyclized by sodium hydride in toluene to the tetracyclic ester ethyl 10-benzyloxy-7-chloro-11-methoxy-1,3,12-trioxo-1,2,3,4,4a,5,12,12a - octahydronaphthacene - 2 - carboxylate.

90 milligrams of the tetracycline ester prepared as described above, and 2.0 grams of ammonium formate are mixed in a tube and suspended in a boiling xylene bath. The mixture slowly melts forming two layers, and is then heated for a total of 3 hours. The mixture is poured into water, and the product is extracted into ethyl acetate. The ethyl acetate solution is concentrated to dryness, leaving a residue. This product is treated immediately with a boiling mixture of 1:1 acetic acid:concentrated hydrochloric acid to form dedimethylamino-6-demethyl-12a-deoxyanhydrochlortetracycline, crystallizing as orange needles from dimethyl-formamide which decompose at ca. 250° C.

EXAMPLE 2

*Preparation of 5-chloro-1,2,3,4,4a,9,9a,10-octahydro-8-hydroxy-1,3,9-trioxoanthracene-2-carboxamide*

The 8-chloro-1,2,3,4-tetrahydro-5-methoxy-4-oxo-2-naphthaleneacetic acid described in Example 1 is demethylated by treatment with hydrogen bromide in acetic acid, and the resulting phenol is benzylated by the action of benzyl chloride in alkali, to give 8-chloro-1,2,3,4-tetrahydro-5-benzyloxy-4-oxo-2-naphthaleneacetic acid. This product is treated with ethyl chloroformate and triethylamine, and the mixed anhydride so formed is reacted with magnesio ethoxy diethyl malonate. The acylmalonate so obtained is warmed with sodium hydride in toluene for 1.5 hours at reflux and the reaction mixture cautiously acidified to give ethyl 5-chloro-1,2,3,4,4a,9,9a,10-octahydro-8-benzyloxy-1,3,9-trioxoanthracene-2-carboxylate.

To a small test tube are added 90 milligrams of ethyl 5-chloro-1,2,3,4,4a,9,9a,10-octahydro-8-benzyloxy-1,3,9-trioxoanthracene-2-carboxylate and this is covered by 1.0 gram of ammonium formate. The test tube is partially immersed by a xylene bath and the system heated under a nitrogen atmosphere until the xylene begins to boil. The test tube is thus heated for 20–30 minutes and allowed to cool. The contents of the tube are taken up in water and ethyl acetate, the ethyl acetate layer is wahsed with water and then evaporated to dryness in vacuo. The resulting brown acid is warmed briefly on the steam bath with a few milliliters of 1:1 concentrated hydrochloric acid-acetic acid containing several drops of water. On cooling there is obtained by filtration the light brown carboxamide, M.P. 228°.

We claim:

1. A process of preparing amides of the formula

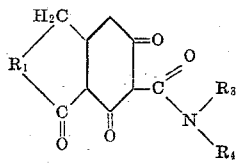

in which $R_1$ is a halogen and hydroxyl substituted divalent aromatic hydrocarbon radical having up to 10 carbon atoms and $R_3$ and $R_4$ are selected from the group consisting of hydrogen atoms and methyl radicals, which comprises contacting an ester of the formula:

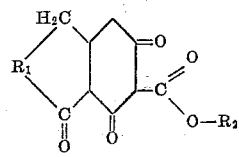

in which $R_1$ has the value hereinbefore given and $R_2$ is a lower alkyl radical, with a member of the group consisting of ammonium formate, methylammonium formate and dimethylammonium formate at a temperature of from about 100° C. to about 160° C.

2. A process of transforming a lower alkyl ester of the 2-carboxy tetracycline series into the corresponding amide which comprises contacting a tetracycline-2-carboxylic lower alkyl ester with a member of the group consisting of ammonium formate, methylammonium formate and dimethylammonium formate at a temperature of from about 100° C. to about 160° C.

References Cited in the file of this patent

UNITED STATES PATENTS

| | | |
|---|---|---|
| 2,062,614 | Schmelzer et al. | Dec. 1, 1936 |
| 2,464,094 | Meade | Mar. 8, 1949 |
| 2,812,349 | Gordon | Nov. 5, 1957 |

OTHER REFERENCES

Audrieth et al.: J. Org. Chem., vol. 3, pp. 312–316 (1938).

Fellinger et al.: J. Am. Chem. Soc., vol. 60, pp. 579–81 (1938).

Audrieth et al.: J. Am. Chem. Soc., vol. 64, pp. 2498–9 (1942).

Degering: An Outline of Organic Nitrogen Compounds, pp. 399, 489–490 (1945), University Lithoprinters, Ypsilanti, Mich.

Stephens et al.: J. Am. Chem. Soc., vol. 76, pp. 3572, 3575 (1954).

Webb et al.: J. Am. Chem Soc., vol. 79, pp. 4563–4 (1957).

Chem. and Engineering News, Mar. 9, 1959, pp. 36, 37.